United States Patent [19]

Samuelsson et al.

[11] Patent Number: 5,761,672
[45] Date of Patent: Jun. 2, 1998

[54] DISTRIBUTED DATA BASE SYSTEM

[75] Inventors: Bo Mikael Samuelsson, Stockholm; Anders Björnerstedt, Danderyd, both of Sweden

[73] Assignee: Telefonaktiebolaget LM Ericsson, Stockholm, Sweden

[21] Appl. No.: 384,733

[22] Filed: Feb. 7, 1995

[30] Foreign Application Priority Data

Feb. 8, 1994 [SE] Sweden .................................. 9400410

[51] Int. Cl.$^6$ ............................................. G06F 17/30
[52] U.S. Cl. ............................................. 707/104; 707/100
[58] Field of Search ................................. 395/200, 600, 395/650, 700, 601, 611, 612, 613, 614, 615, 616; 364/280.6, 280.9

[56] References Cited

U.S. PATENT DOCUMENTS

| | | |
|---|---|---|
| 4,901,231 | 2/1990 | Bishop et al. |
| 4,980,822 | 12/1990 | Brantley |
| 5,187,790 | 2/1993 | East et al. |
| 5,247,673 | 9/1993 | Costa et al. |
| 5,280,612 | 1/1994 | Lorie et al. ................. 395/600 |
| 5,428,782 | 6/1995 | White ......................... 395/650 |
| 5,442,791 | 8/1995 | Wrabetz et al. ............. 395/650 |
| 5,560,005 | 9/1996 | Hoover et al. ............... 395/600 |

FOREIGN PATENT DOCUMENTS

| | | |
|---|---|---|
| 0 397 644 | 9/1990 | European Pat. Off. |
| 0 405 829 | 1/1991 | European Pat. Off. |
| 0 497 600 | 8/1992 | European Pat. Off. |

OTHER PUBLICATIONS

"Principles of Distributed Database Systems", M.T. Özsu et al., Prentice–Hall, 1993, pp. 510–511.

Primary Examiner—Thomas G. Black
Assistant Examiner—Ruay Lian Ho
Attorney, Agent, or Firm—Burns, Doane, Swecker & Mathis, L.L.P.

[57] ABSTRACT

In a distributed data base system, different parts of the data base are handled by each of a number of interconnected processors. The different data base parts contain a number of data entities. There are provided for each of such data entities global information relating to the processor in which the data entity is located, and local information relating to the location of the data entity in the own processor. The global information is located in each processor in the system in the form of global information common to and specific for each set of data entities. More particularly, the sets of data entities comprise distribution entities each of which includes information relating to a number of instances of a certain type of data entity located in a certain processor, and information by which the address to this processor can be found.

4 Claims, 7 Drawing Sheets

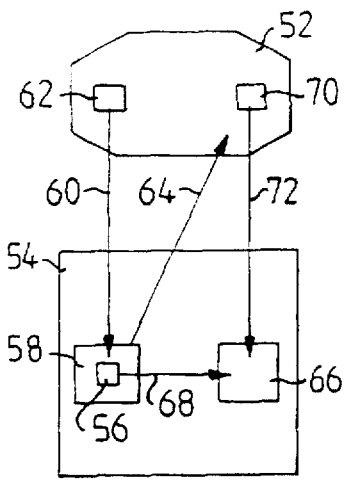
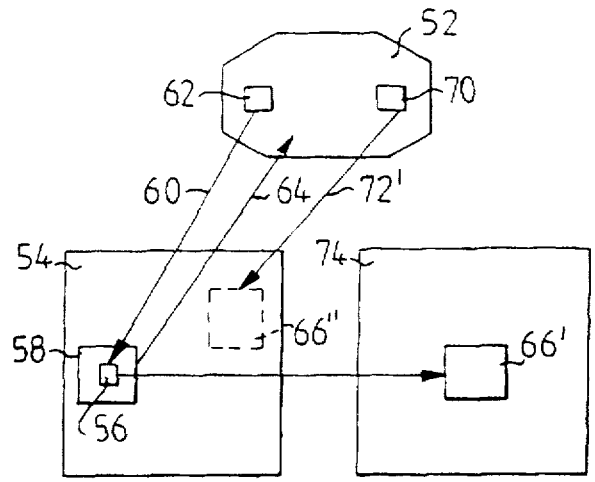
FIG. 4    FIG. 5
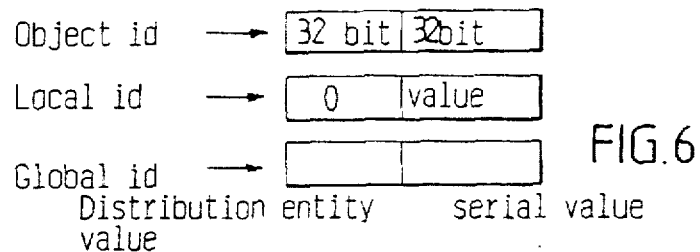
FIG. 6
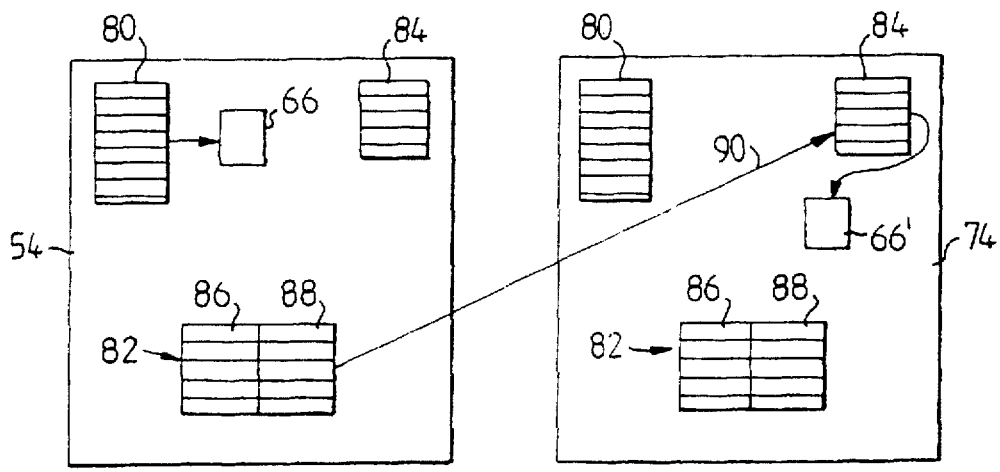
FIG. 7

| master/<br>agile<br>MDP | physical<br>MDP<br>sequence | processor |
|---|---|---|
| master | <9914,0> ..<9914,49> | processor 4 |
| master | <9914,50>..<9914,99> | processor 5 |
| agile | <9914,0> ..<9914,33> | processor 2 |
| agile | <9914,34>..<9914,66> | processor 6 |
| agile | <9914,67>..<9914,99> | processor 8 |
| master | <7122,0> ..<7122,9> | processor 1 |

| Object Type<br>name | Object<br>Type no | Number of<br>MDP:s |
|---|---|---|
| Subscriber | 9914 | 99 |
| Lic | 7122 | 9 |

DISTRIBUTED DATA BASE SYSTEM

BACKGROUND

The present invention generally relates to a distributed data base system in which different parts of a data base are handled by one each of a number of interconnected processors, the different data base parts containing a number of data entities.

More particularly the invention relates to data base distribution by which is meant, in the present connection, how data entities are addressed and distributed in the data base system.

By data entities is here meant e.g. entities of the type called object in an object oriented system.

In an object oriented distributed data base system each of the included processors may need to access objects in its own data base part, as well as in the data base parts of other processors. For each object there is therefore information relating to the subnetwork and the processor in which the object exists, information about an agent in another processor executing a desired service, e.g. get object, and information about where exactly in the memory of the processor the object in question is located. If all this information is available on all processors this results in very large addressing tables, and mass updatings of the address of the objects over the whole data base system, when an object is created, removed, or moved.

EP 405,829 relates to a telecommunication system in which the software is implemented by means of independent software components in the form of objects. A function "runtime linker" in a "runtime system" records the objects and stores a data pointer to the data of the objects. To communicate with another object, a source object transmits a message to the runtime system. The message includes name and identity of the method of the destination object.

The runtime system serves only a single processor or group of objects and calls the destination object by means of the identity of the method and the data pointer if the destination object belongs to a group of objects served by the runtime system. In case a destination object is located on another processor, the runtime system broadcasts the message to other processors. In each of the receiving processors, the runtime system searches its "linker table" for the symbolic name of the destination object of the message and, if found, calls the destination object on the basis of the method identification in the message and the data pointer information in the runtime linker. Interprocessor messages include a source processor designation. The runtime system of each of the processors stores the name of the source processor and the symbolic name of the source object when an interprocessor message is received.

An "alias table" contains all "alias names" of the local processor registered. If a name is not listed in the alias table an investigation is made with respect to whether the destination object is located in the linker table. If the answer is no an investigation is made in a destination table and if the name of the destination processor is known, a message is sent to the destination processor.

In U.S. Pat. No. 4,901,231 there is described a multiprocessor system executing over a plurality of processors. A user process in one processor may access system resources in the other processors. When a user process accesses a local file, the access is made i.a. by means of a user file table. When the user process accesses a remote file, the access is made via a port table, over a virtual channel identified by means of the port table to a part process and then via the user file table and system file table of the part process.

U.S. Pat. No. 5,187,790 relates to a computer system with a plurality of simultaneously running processes, including at least one server process and a plurality of client processes. Each process has a list of identities representing object access rights. Each object has an access checking list with identities to be used for determining the processors which may access the object.

SUMMARY

A general object of the present invention is to provide a system of the kind defined by way of introduction, which may work with a small amount of address information to be stored, maintained and distributed.

Another object of the invention is to provide a system of the kind defined by way of introduction that admits simple manual configuration in an application (i.e. a program writing and reading in the data base), as well as in the data base, and which in case of creation of a data entity makes unnecessary statement regarding to which processor it belongs, i.e. this shall be predefined.

Further objects of the invention are to provide a system of the kind defined by way of introduction, that admits a flexible distribution, and a redundancy changeover, that guarantees service maintenance and availability, i.e. there must not be too many address informations which must be updated in case of redundancy changeover.

According to a first aspect of the invention the above objects have been attained in a distributed data base system in which different parts of a database are handled by one each of a number of interconnected processors. The different database parts include a number of data entities. For each such data entity there is global information regarding in which processor the data entity is located, and local information regarding where the data entity is located in the own processor. The global information is located in each processor in the system in form of global information common and specific to each of predefined sets of data entities.

According to a preferred embodiment said sets of data entities consist of distribution entities, each of which contains information regarding a number of instances of a specific type of data entities located in a certain processor, and information by means of which the address to that processor can be found.

The data entities may be addressed either by means of key values or by means of data entity identities, said data entity identities containing information regarding the distribution entity to which the data entity belongs, as well as information identifying the data entity.

The data entity identities may include local and global data entity identities, each having two information fields. For the local identity one of these fields identifies the own processor and the other one identifies the data entity. For the global identity one of the fields identifies a distribution entity and the second one identifies the data entity.

The local information may be included in at least three tables. A first one of these contains local data entity identities, a second one includes global data entity identities, and at least a third one contains key values. The global information is included in a fourth table which contains the distribution entity number, and for each such distribution entity number points to another processor.

According to a second aspect the stated objects of the invention have been attained with a method for accessing, in a distributed data base system. a data entity belonging to a specific class, by means of a key value unique to the data entity and an identification number for the class in question. In said data base system different parts of a database are handled by one each of a number of interconnected processors. The different database parts contain a number of data entities of the kind just referred to above, and for each such data entity there is global information regarding in which processor the data entity is located, and local information regarding where the data entity is located in the own processor. Searching for the data entity starts in the own processor by means of a key value. If this search reveals that the data entity does not exist in the same processor, the method includes the following further steps. A logical distribution entity number is created, that identifies information regarding a number of instances of the class of the data entity to be accessed, which are located in a certain processor, and address information regarding this processor. A corresponding physical distribution entity number is created by combining information regarding the class of the data entity and the logical distribution entity number. The processor in the data base of which the searched data entity is located, is identified by means of the physical distribution entity number. A message is sent to the processor in question containing information regarding the searched data entity, and the searched data entity is searched by local searching by means of the key value in the found processor. A copy of the found data entity is returned to the processor that has requested the access.

According to a third aspect the stated objects are attained, according to the invention, by a method for accessing, in a distributed data base system. a data entity belonging to a specific class of data entities. In said data base system different parts of a database are handled by one each of a number of interconnected processors. The different database parts contain a number of data entities of the kind just referred to above, and for each such data entity there is global information regarding in which processor the data entity is located, and local information regarding where the data entity is located in the own processor. A local data entity identity is created, which contains information regarding a distribution entity which in turn includes a first part information regarding a number of instances of the class of the data entity which are located in the own processor, as well as information identifying the data entity. Search is first started in the local processor in order to try to find there the data entity by means of the local data entity. If this search reveals that the data entity is not located in the own processor, the method includes the following further steps. The local data entity identity is converted to a global data entity identity which contains first information regarding a distribution entity. This in turn includes information regarding a number of instances of a specific class of data entities located in a certain processor, to which class the data entity belongs, and information regarding the address to that processor. The global data entity identity also contains second information identifying the data entity. A search is performed for the processor in which the searched data entity is located by means of the distribution entity included in the global data entity identity. A message is sent to the processor in question in which the global data entity identity is included, and a search is performed in the found processor by means of the global data entity identity. A copy of the found data entity identity is returned to the processor that has started the access.

According to a fourth aspect the stated objects are attained, according to the invention, by a distribution entity in a distributed database system. in which different parts of a data base are handled by each of a number of interconnected processors. Said different database parts contain a number of data entities. Said distribution entity includes information regarding a number of instances of a specific type of data entities located in a certain processor, and address information regarding this processor.

According to a fifth aspect the stated objects are attained. according to the invention, by a distribution entity in a distributed database system, in which different parts of a database are handled by each of a number of interconnected processors. Said different database parts contain a number of data entities. Said distribution entity includes information common and specific to a predefined set of data entities.

The distribution entity according to the fourth and fifth aspects may form part of a data entity identity which contains information regarding the distribution entity and information identifying the data entity.

According to a sixth aspect the invention relates to an identity entity for a data entity in a distributed database system. in which different parts of a database are handled by each of a number of interconnected processors. The different database parts contain a number of data entities. Said identity entity includes first information regarding a distribution entity, which in turn contains information regarding a number of instances of a specific type of data entities located in a certain processor, to which type the data entity belongs, and information regarding the address to that processor. The identity entity furthermore includes second information identifying the data entity.

BRIEF DESCRIPTION OF THE DRAWINGS

The invention and different embodiments of it will now be described more closely with reference to the attached drawings on which FIG. 1 schematically shows a distributed data base system.

FIGS. 4 and 5 schematically illustrate addressing according to the invention in the case that a searched object is located in the same processor or in another processor, respectively.

FIGS. 6a–c show the contents in object entities which are engaged in the processes shown in FIGS. 4 and 5, respectively.

FIG. 7 shows addressing tables used in connection with the processes according to FIGS. 4 and 5.

DETAILED DESCRIPTION

Figure 1:
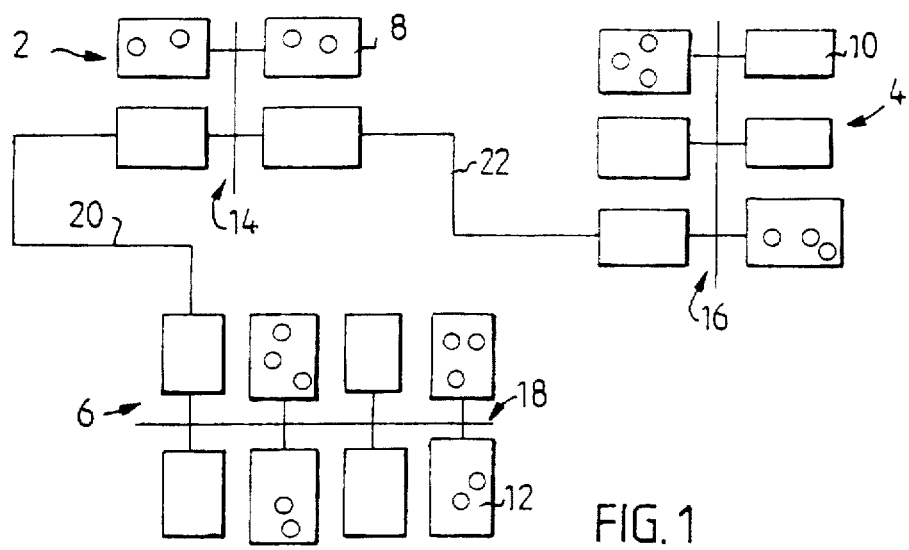

In FIG. 1 a distributed data base system is schematically illustrated, which is assumed to be object oriented, i.e. its data are organized as objects. An object is, in this connection, a hold together amount of data which may be read either directly or by calling methods in the object. Concepts used below in this connection are object class or type, attribute, and instance. An example of an object class may be objects representing information of telephone subscriptions. This object may then contain attributes such as telephone number and the number of the line circuit. Instances of the object form different subscriptions.

The system includes three subnetworks designated 2, 4 and 6, respectively. The subnetworks 2, 4 and 6 include four, six and eight, respectively, processors, of which one in each subnetwork is designated 8, 10 and 12, respectively. The processors in each subnetwork are interconnected by means of links indicated at 14, 16 and 18, respectively, for the respective subnetworks 2, 4 and 6. The subnetworks 2, 4 and 6 are interconnected by means of links 20 and 22.

Each of the processors included in the distributed data base system may contain, in the respective appurtenant part, not shown in FIG. 1, of the total data base, a number of objects, which may need to be accessed from the other processors. In connection with each object there is conventionally, besides part information relating to the subnetwork and the processor in which the object is located, and part information regarding an agent in another processor performing a desired service, also part information regarding where exactly the object in question is located in the memory of the processor. The part information just mentioned regarding the agent in another processor will henceforth in some cases be denominated "communication process". The services which may be of interest in the present case are, as will be described more closely below, get object in the memory of the processor, and handle the communication between the own processor and another processor.

Figure 2:
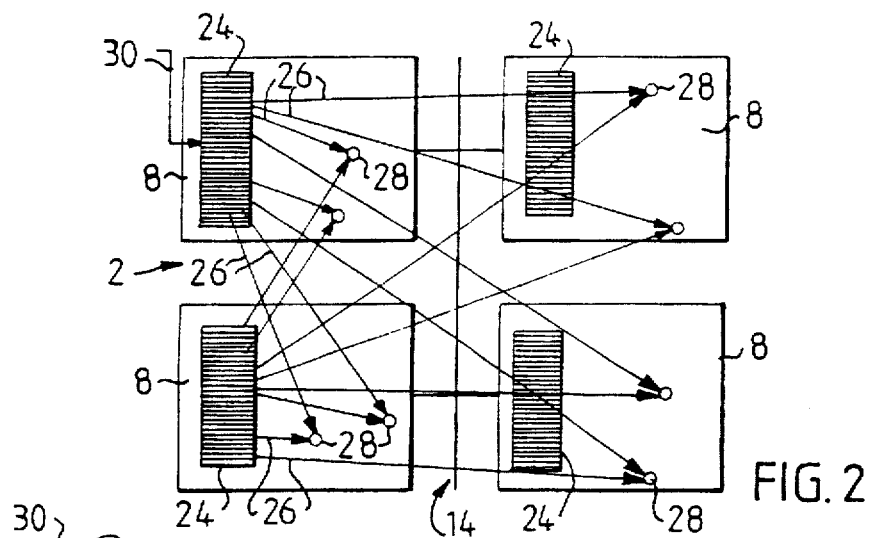
FIG. 2 is intended to illustrate addressing principles in a conventional system of the kind shown in FIG. 1.

If the total information consisting of these part informations would be available on all processors this would result in very large addressing tables and necessitate mass updatings of the address of the objects over the whole data base system. This is illustrated in FIG. 2, which shows a part of the data base system, viz. the subnetwork 2. Each of the four processors 8 is shown schematically as containing an addressing table 24, which is the same for all processors. Each addressing table 24 has pointers to all objects in the own processor and in all other processors included in the data base system. This is illustrated by means of some arrows 26, pointing to some objects 28. For the sake of clarity such arrows have been deleted for the processors located to the right in the Figure. Each time a new object is created, its address has to be distributed to all other processors, or alternatively be recorded in a central catalogue, from which the address information may be obtained at access. This gives great flexibility with respect to the distribution of objects, but very large address tables.

In FIG. 2 there is also an arrow 30 pointing towards one of the addressing tables 24 for indicating the introduction of an object identifying key value in the table in question intended to result in access to any of the objects included in the data base system.

In short, the invention is based upon the thought that global information, which i.a. indicates which processor an object is located in, is common to a greater number of objects. As will be described more in detail below, this global information is identical for all processors. For the sake of clarity it is illustrated in FIG. 3 in the form of an address table, which is shown only for one of the processors at 32.

The global information 32 includes information regarding a number of distribution entities, each of which contains information regarding a number of instances of a certain object class.

Figure 3:
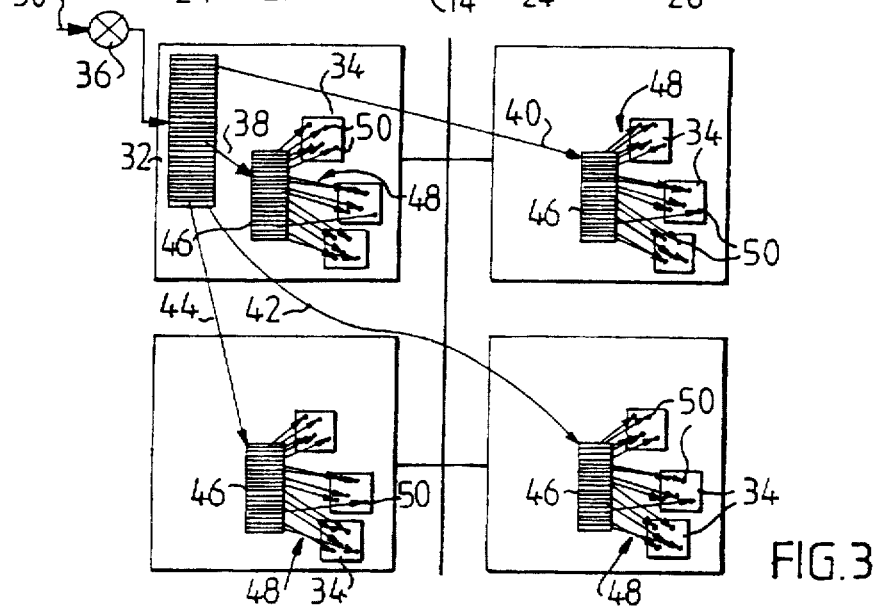
FIG. 3 is intended to illustrate the general addressing principles according to the invention in a data base system of the kind shown in FIG. 1.

In FIG. 3 some of these distribution entities have been designated 34. For each such distribution entity 34 it is also stated in the table 32 to which processor it belongs. The key value mentioned in connection with FIG. 2 is transformed, indicated at 36, to an index corresponding to a certain distribution entity 34. The table 32 will therefore, for each distribution entity 34, include an address pointer pointing to a certain processor, to which the distribution entity in question belongs. A number of such address pointers are indicated in FIG. 3 at 38, 40, 42 and 44, respectively. More particularly, these pointers point towards a further table 46 located in each processor, from which further address pointers 48 point towards objects located in the distribution entities 34 in the corresponding subdatabase. Some of these objects are indicated as points 50.

Embodiments of the addressing principle according to the invention will now be described more in detail with reference to the following Figures.

As seen from an application level, a data base object record may be addressed in two ways, viz. by means of a key or by means of a data object identity.

In FIG. 4 a user process is designated 52 and a processor is designated 54. The process 52 accesses by means of a key value an attribute 56 of an object 58 included in the memory of the processor 54. The access, indicated by an arrow 60, is made by a method in an agent object 62 created for the purpose in the user process 52. In response the object 58 returns, arrow 64, a local object identity stored in the attribute 56 and referring to another object 66 in the memory of the processor 54. The reference is indicated by means of an arrow 68. The process 22 now opens the object 66 by means of the local object identity and creates a second agent object 70 containing a method by means of which attributes in the object 66 may be read, arrow 72. In FIG. 4 an object identity is thus used for addressing an object in the same processor.

The detour over the object 58 for reaching the object 66 in FIG. 4 presupposes that it is known from the beginning that a reference in the object 58 to the object 66 shall be searched, and is only an example. Object oriented data bases data are generally modelled in such a way that accessing requires "navigating" in the data base, i.e. following references from object to object.

The situation in FIG. 5 differs from the one in FIG. 4 in that the object to be addressed is located in another processor 74 where it is designated 66'. In this case there is created in the memory of the processor 54 a copy 66" of the object 66', the user process 52 accessing attributes in the copy 66", indicated by an arrow 72', by means of the agent object 70. This will be described in a greater detail further on.

As has appeared from the above the object identity may be used by the application for addressing objects locally or in another processor. If the object does not exist locally in the own processor, such as in FIG. 5, the distributed access to another processor will be handled transparently for the application, so-called hidden distribution. The object identity will then be converted, by a distribution logic of the data base, to a global object identity. The object identity may, however, also be used by the application in its own distribution protocol, so-called open distribution, but will then first be converted for external use by the application, more particularly to the global object identity.

With reference to FIG. 6a an object identity of the kind discussed above may contain two fields, e.g. each for 32 bits. The first field identifies the distribution entity to which the object belongs, and the other field indicates a serial number identifying the object. The identity of the distribution entity is generated by a support system outside the database system, and the serial number is assigned at the instance of objects in an application system, i.e. programs reading and writing in the data base. The connection between the externally visible name of the object and the distribution entity is determined in a design phase and will then not be changed during the lifetime of the application system.

In the example according to FIG. 4 the object identity has a value, e.g. 0, in the first field for indicating that the object, i.e. 66, is located in the own processor, and therefore the denomination "local object identity" is used for this, of. FIG. 6b. In the case according to FIG. 5, and with reference to FIG. 6c, the object identity is transformed to a global object identity, as mentioned. As will be described more closely below, this is performed by giving a distribution entity value to the first field in the object identity, which may be used for identifying the processor to which the object belongs.

With reference to FIG. 7 and to that described above in connection with FIGS. 3–5, each processor includes four tables 79, 80, 82 and 84, respectively.

The table 79 is a table for object identifying key values. The table 79 is used in the case according to FIG. 4 by the process 52 for finding the object 58 by means of a pointer located in the table in association with the current key value. Although not shown, there may, as a matter of fact, be such a key table 79 for each keyed object class in each processor.

The table 80 includes the local object identities pointing to objects in the same processor, henceforth called "the own processor". In the case according to FIG. 4 the data base handler sees the zero in the first field and enters the table 80 so that the object 66 is found.

The table 82 contains two columns 86 and 88, the first column 86 for a distribution entity number, and the second column 88 generally pointing to another processor or, logically, a data base handler in this other processor. In the present example the second column is assumed to point to a communication port of the kind described in the U.S. patent application No. 08/193,844, corresponding to the Swedish patent application 9300431-5, and which is associated with an activity proceeding in the second processor. The U.S. patent application No. 08/193,844 is incorporated herein by reference. More particularly, and shortly, a communication port according to said U.S. patent application, henceforth for the sake of simplicity only called port, is intended to mean a type of resource which belongs to the communication mechanisms of an operating system, and with which an activity uses to establish a connection. The concept of activity is used, in the same U.S. patent application No. 08/193,844, to define a chain of jobs created in an operating system as a result of an independent external or internal event, plus the sum of the resources that the chain uses during its execution. By a job is furthermore meant, still in the US patent application in question, a phenomenon directed to a process so that a method in an object owned by the process is executed, a job in that connection being able to create new jobs directed to other processes or the own process.

The table 84, which corresponds to the table 46 in FIG. 3, contains two columns 84' and 84", of which the first one is for the global object identity, and the other one for pointers to a corresponding object in the memory of the processor.

In the description below of the case according to FIG. 5 the concept "port" will, for the sake of clarity, be replaced by the associated concept "processor" or "data base handler" according to the above explanation.

In the case according to FIG. 5, the data base handler in the own processor 54 enters, generally speaking, the table 82 of this processor and finds the processor 74 according to the arrow 89. A message is sent to the data base handler in the other processor 74, said message i.a. containing an indicator indicating whether the object shall be searched for by means of key or global object identity. If the global object identity is known, which is presupposed in FIG. 5, the data base handler in the processor 74 continues the search process, according to arrow 90, by entering with the global object identity the column 84' for global object identities in the table 84 of the processor 74. On the same line as the found global object identity in the table 84, but in the other column 84", the pointer to the object 66' is found, according to arrow 92.

If, alternatively, said indicator indicates that the search shall be made by means of a key, such as the case may be if there is no global object identity, the data base handler in the processor 74 directs the search process, according to arrow 94, to the table 79 of the processor 74. By means of the key value of the searched object 93, the address of this object is found there, according to arrow 95.

If, in the case according to FIG. 5, there should be further objects in the memory of the processor 74 which belong to the same distribution entity, i.e. objects with the same number of the distribution entity, but different serial number, the process is transferred to the processor 74.

With reference to FIGS. 8–18 two practical embodiments will now be described, wherein also the use of the tables 79, 80, 82, 84 will appear more in detail.

In the object class description below there is specified a persistent object class in a language used to describe object classes, e.g. DELOS, which is mentioned in the journal Tele, No. 4/93, in an article headed "Development of software" by Göte Andersson. More particularly there is the question of an object of the class Subscriber which contains 2 attributes, of which one is a primary key, i.e. a distribution attribute.

---

OBJECT TYPE Subscriber IS
PERSISTENT PROPERTIES
PRIMARY KEY subscrNum;

-continued

```
--MDP-sequence 0 ... logicalMDPhigh
ATTRIBUTES
subscrNum:   SubscriberNumber;
iAge:   Integer
END;
TYPE SubscriberNumber IS STRING (ISO8859) END;
```

In this representation the first line defines the object class, i.e. Subscriber. The next line indicates storing properties. Thereafter follows a statement of the name of the attribute PRIMARY KEY, i.e. subscrNum.

In the definition—MDP-sequence 0—logicalMDPhigh MDP (Master Data Partition) stands for distribution entity. The definition is an information regarding the maximum distributability of the object class, i.e. the maximum number of distribution entities of the object class in question. The information in question is used for generating input data to a configuration step described more closely below, and for allowing the system to be able to check in runtime that the function keyToMDP, likewise described more closely below, does not return values outside the declared range.

In the first line under ATTRIBUTES it is stated that subscrNum is of the type SubscriberNumber, and in the second line that the method in subscrNum with the name iAge is of the type Integer. In both cases there is the question of predefined types.

In the last line in the representation it is defined more closely with "IS STRING" a property of the attribute type SubscriberNumber, viz. that the attribute is indicated as a string of digits.

From the above object class description as well as from the following similar description of methods in association with the object class, code is generated in a specific data definition language by a compiler for this language. The following description, as well as the description above, is based, as an example, on the use of agent objects of the kind described in the U.S. patent application No. 08/264,059, corresponding to the Swedish patent application 9302175-6, for attaining data access in case of using the addressing method according to the invention. The just mentioned U.S. patent application No. 08/264,059 is incorporated herein by reference. In this U.S. patent application there is also described generation of code in a way here indicated, and therefore no closer description is required here. The agent object in question is called DOA in the same US patent application, which stands for "Data Object Agent", and the same denomination will also sometimes be used here.

In a method for transforming the key value to distribution entity the method framework is generated by DELOS but the application designer must write how the key shall be translated to a distribution entity number. The algorithm forms part of the DOA-class and is dependent from the addressed object class. In the present case it is assumed that the primary key=the telephone number 1111122. The method in question is performed by:

DicosDbMDP

Subscriber:keyToMdp (key)

where keyToMdp is a called transforming function to be described more closely below.

In the present example it is assumed that the two last significant digits 22 are masked out, with a value range of 00→99. The masked out value thus becomes a distribution entity number 22.

The method is used by both of the operations create (instance) and open(instance), i.e. creation and opening, respectively, of instances.

For accessing, i.e. reading or writing in an object, a local copy of the object is installed, cf. 66" in FIG. 5, in the executing processor, as has appeared from the above description with reference to FIG. 5. In this connection reference is made to two types of copies, viz. "lazy" copies and "agile" copies. Default, which may always be used, is "lazy", implying that the object is fetched in connection with access. "Agile" copies are configured in advance and the unit for agile replication is a whole distribution entity.

For installation configuration allocation of master data and agile copies shall be made to a desired processor. This is done for each distribution entity by stating that a sequence of master or agile distribution entities shall be allocated to a processor and a processor pool, respectively, i.e. a system of more processors in a distributed data base system. This is specified in a file having the appearance shown in FIG. 8.

Figures 8, 9, 10:
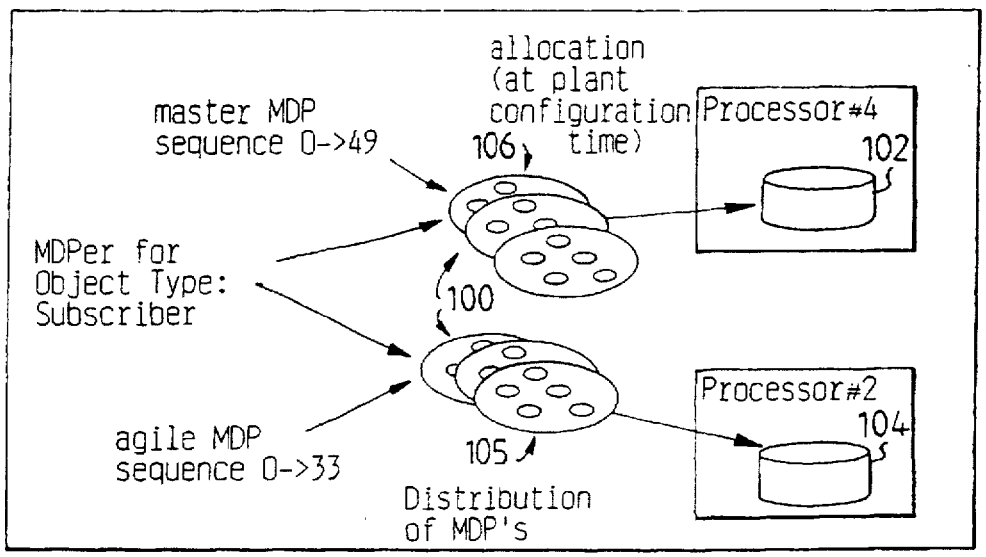
FIG. 8 shows a file in which allocation of sequences of distribution entities to different processors is specified.
FIG. 9 shows a file stating the distribution of distribution entities for each object class.
FIG. 10 illustrates the principles for loading distribution entities on several processors by means of the information in FIGS. 8 and 9.

In FIG. 8 the first column indicates master- or agile-MDP. The second column indicates a physical MDP sequence, the two subcolumns of the second column indicating object class and MDP-No. In e.g. the first line, 9914 is an object class number identifying the object class, and 0 and 49 indicate the distribution entity number, i.e. it is indicated that there is the question of fifty distribution entities of an object class having the class number 9914. The last column indicates processor in which the master- or agile-distribution entity in question shall be installed.

Furthermore there is required information about the distribution entity distribution for each object class as input data to a loading module which shall be loaded into the system. By the concept loading module is here intended the same as in the above mentioned U.S. patent application No. 08/264,059. The distribution entity distribution in question is specified in a file having the appearance shown in FIG. 9, said file getting its values from FIG. 8.

In FIG. 9 the first column indicates object class name (objectType) and the second column indicates object class number (dbClassId). From the third column the number of distribution entities for the object class (logicalMDPhigh) appears, the numbering of the distribution entities beginning with 0. Both object classes are unlimited as regards the number of objects, which may be created, but the table states that the number of distribution entities, i.e. the maximum number of processors, to which the objects can be distributed, is 100 for Subscriber and 10 for Lic.

FIGS. 8 and 9 include configuration data with distribution entity allocation information for all object classes. This information shall be loaded into all processors in local data bases. More particularly, the distribution entity allocation information is loaded by the data base to class object by an initiation function in the data base during the base loading phase. Thus, this is included in the basic functionality.

FIG. 10 is intended to illustrate how this loading appears physically. For the sake of simplicity there are only two of the processors included in FIG. 8 shown, viz. the processors 4 and 2, cf. lines 1 and 3 in FIG. 8.

More particularly, it is shown how distribution entities 100 for the object class Subscriber are loaded into the processors #4 and #2, which are included in each a subdatabase 102 and 104, respectively. Into the memory of the processor #4 master distribution entities 106 within the sequence 0→49 are loaded, whereas into the memory of the processor #2 agile distribution entities 108 within the sequence 0→33 are loaded.

The above defined object class is installed into a data base by void Subscriber::install ("1111122").

object instance, e.g., is created by subx=Subscriber:: create ("1111122").

The object instance, which will thus belong to the distribution entity 22, as appears from the above, is initiated in the memory of the processor #4 according to the distribution entity allocation to processors. The key is transformed according to the above to a distribution entity number according to an algorithm. The algorithm is a function that takes the primary key data type as an input parameter and returns an integer between 0 and logicalMDPhigh. The function should distribute possible key values evenly to the distribution entities which have been identified, but it is for the object class designer to select a suitable algorithm, taking into consideration the own design.

The object is opened up for updating by subx=Subscriber::openUpdate("1111122")

The database will handle the distributed access transparently for the application via data base handlers, so-called hidden distribution, as has been mentioned earlier.

The search for an object in a distributed data base system begins first in the local processor in order to try to find the current master object by means of the table 79 or 80 in FIG. 7, depending upon whether the search should be carried through by means of a key or the local object identity.

Figure 11:
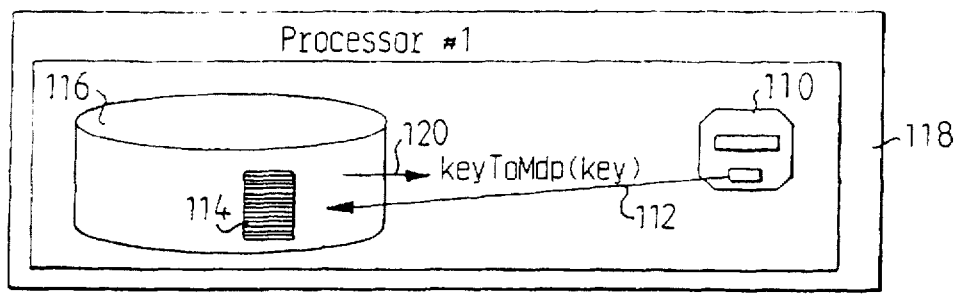
FIG. 11 illustrates access of an object by means of a key in the case that the object does not exist locally in the same processor as the accessed process.

FIG. 11 illustrates more in detail how an object is accessed by means of a key if the object is not present locally in the same processor as the accessing process. More particularly, the process indicated at 110 which is executed in another processor, searches, arrow 112, in a local key table 114 corresponding to the key table 79 in FIG. 7, in a subdatabase 116 with a processor 118. The database handler of the database 116 calls the transformation function keyToMdp(key) by the above mentioned DOA-method Subscriber::keyToMDP(key), arrow 120, using the key as parameter, which gives a logical MDP-No. Thereupon a physical MDP-No. is created by combining the class number of the instance and the logical MDP-No according to FIG. 12. This physical MDP-No forms the first field of the global object identity, cf. FIG. 6c.

Thereupon the processor to which the distribution entity belongs is looked up in the table 82, cf. FIG. 7. Then a message is sent to the processor where the object is present, or actually to the port which has been published by the database handler process in this processor. The message includes object class and primary key, since the distribution entity number is not enough for identifying the object uniquely. It also appears by the message what is intended to be done with the object, in order to be able to set a read or write lock if needed. In the present case a write lock is set.

The distribution entity identity is used for finding a network address by means of database internal tables which are distributed on all processors in a distributed database system. The principle of these tables is schematically shown in FIG. 13 though in a real realization the tables are more compressed.

Figure 13:
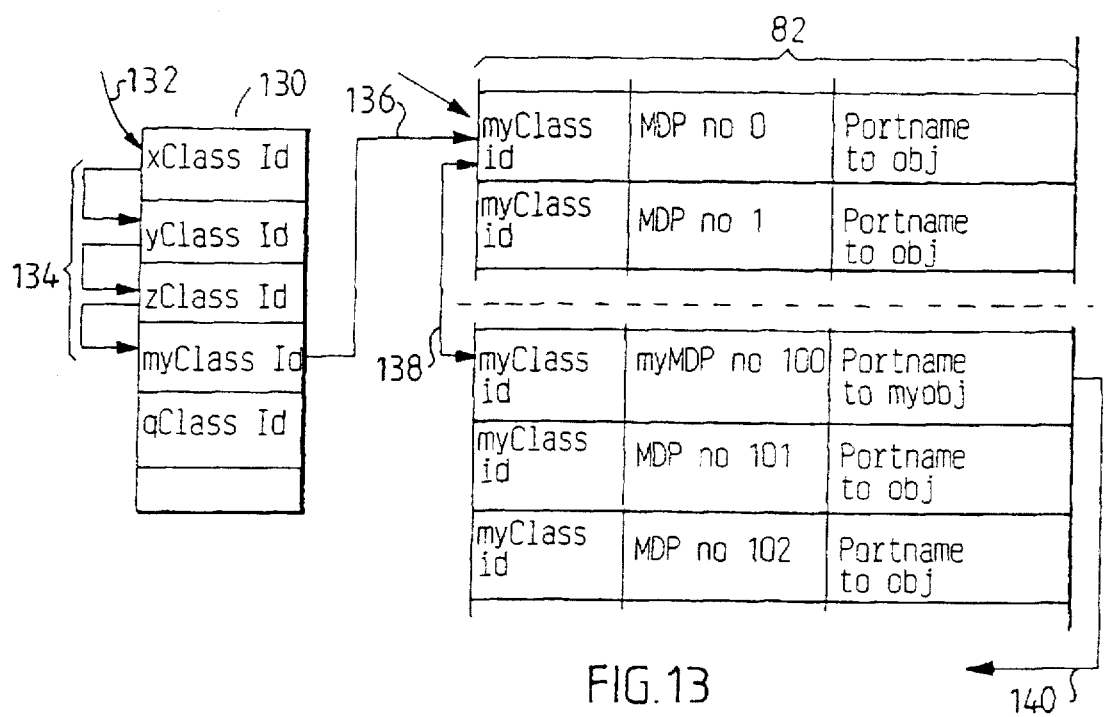
FIG. 13 schematically shows a table used in connection with and illustrating translation of the number of a distribution entity to a network address.

According to FIG. 13 these tables in each processor consist of a search table 130, and a second table corresponding to the table 82 in FIG. 7. The search table 130 includes a line for each object class where the number of the object class is stated. The table 82 includes a line for each distribution entity installed, said line extending over three columns. Each line indicates in the first column an object class number, in the second column a distribution entity No, and in the third column a port name to an object. More particularly it appears from the second table that for the object class number myClass id there are 102 distribution entities with associated identification of the port name to an object.

Having knowledge of the class number of the object searched for, the distribution handler in the own processor starts, arrow 132, a search in the table 130 until the object class number myClass id in question has been found after a search process indicated by arrows 134. This in turn leads, according to a pointer 136, to the set of object class numbers myClass id in the table 82, wherein a search indicated by an arrow 138 is assumed to lead to the distribution entity No. 100. According to the arrow 140 this finally results in addressing the current processor in which the object searched for is present.

Figure 14:
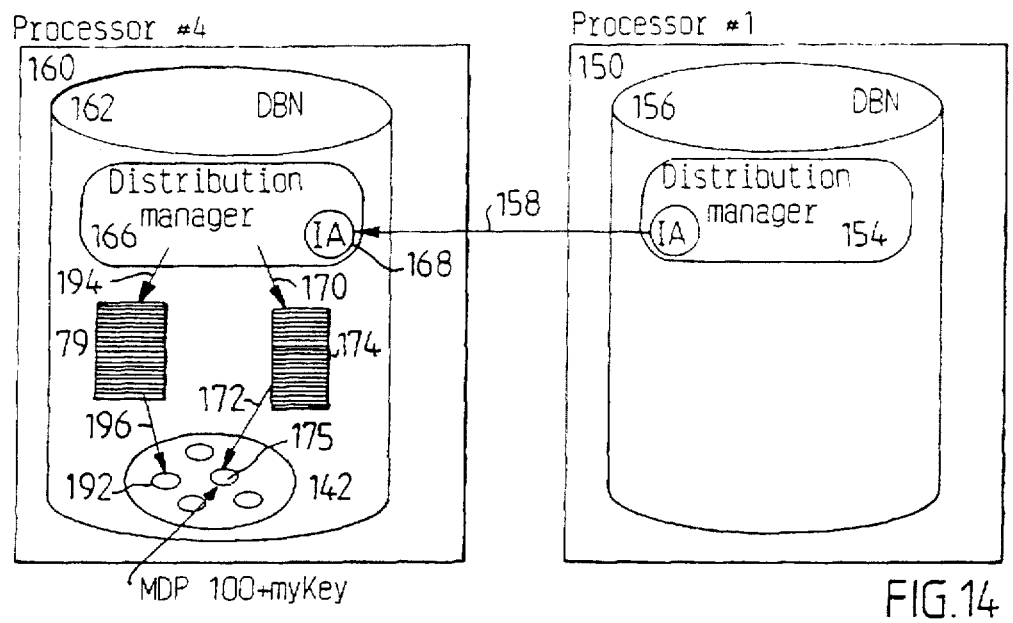
FIG. 14 illustrates two cases of search processes directed to a master object in another processor and aiming at transferring transparently a copy object of this master object to the own processor.
Figure 16:
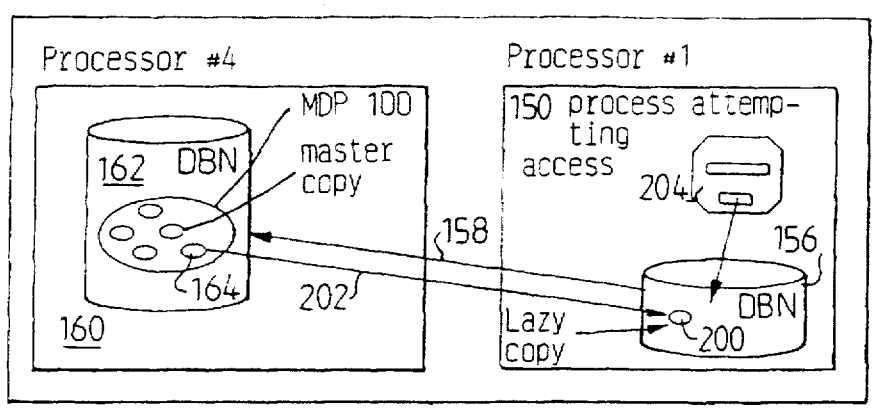
FIG. 16 illustrates the transmission of the copy object after the search process according to FIG. 14 having resulted in detection of the master object.

In FIGS. 14 and 16 there is illustrated more in detail transparent distribution of the kind that has been described shortly with reference to FIGS. 7, 11 and 13.

The situation in FIG. 14 starts from the presumption that the distribution handler in the processor from which the distribution has started, has performed a search process either of the kind using a global object identity, or the kind using a key, and which has been described above with reference to FIG. 13, this being indicated with MDP100+myKey at the arrow 142.

In the processor, designated 150, there is created an interface agent 152 by the distribution handler designated 154 in the database 156 including the processor 150. The message is packed to an export format which is then sent, arrow 158, to the other processor, designated 160, which in a corresponding subdatabase 162 contains a master object searched for. When the message arrives to the database 162 it is received by an interface agent 168 created by its distribution handler 166. When the communication process has been activated which shall handle the distributed communication between the processors, the message will be unpacked and a local search for the object is performed.

If the message contains the global object identity the search is performed according to arrows 170 and 172 via the table 174 of the database 162. The table 174 corresponds to the table 84 in FIG. 7, the arrows 170, 172 indicating the same process as the arrow 90 in FIG. 7. The found object is shown at 175.

Figure 15:
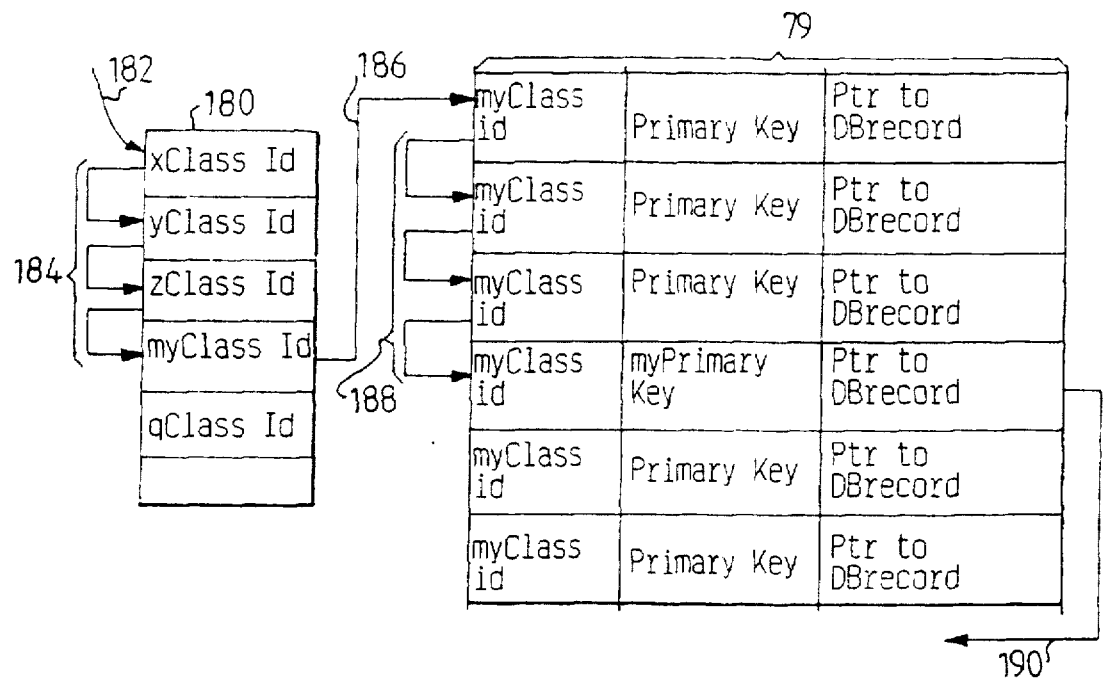
FIG. 15 is a schematic table used for illustrating the search process in one of the cases according to FIG. 14.

The alternative search process in the processor 160 with object class number and primary key in the case that the global identity of the searched object should not be known, is illustrated by the tables in FIG. 15. As in the case with FIG. 13 only the principle is shown schematically in FIG. 15 for the use of these tables, though in a real implementation the tables are also here more compressed.

Tables according to FIG. 15 are included in each processor and consist according to the Figure of a search table 180 and a second table corresponding to the table 79 in FIG. 7. The table 180 includes a line for each object class. The number of the object class being indicated in this line. The table 79 includes a line for each key which is installed, the lines extending over three columns. Each line indicates in the first column object class number, in the second column a key, and the third column includes a pointer to a database object.

As illustrated in FIG. 15 the database handler in the processor #4 performs a search process by means of the object class number my Class Id of the object being searched, which begins according to arrow 182 in the table 180, via arrows 184 leads to the object class number my Class Id in question, and via an arrow 186 leads to the set of objects with the class number my Class Id. Finally there is found, by searching according to arrows 188, a key Primary Key with an associated pointer 190 to the searched object.

The tables according to FIG. 15 are also schematically shown in FIG. 14 as block 79.

The situation in FIG. 14 starts from the presumption that the distribution handler in the subdatabase 156, from which the distribution is started, by means of the tables 130, 82 has performed a search process of a kind similar to that described above with reference to FIG. 13. As earlier there is created in the own processor 150 an interface agent 152 by the distribution handler 154 in the subdatabase 156 of the processor 150. The message is packed to an export format which is then according to the arrow 158 sent to the other processor 160, the database 162 of which contains the searched master object, designated 192.

When the message arrives to the subdatabase 162 it is received by the interface agent 168. When the communication process has been activated that shall handle the distributed communication between the processors, the message will be unpacked and a local search for the object, according to the search process described above with reference to FIG. 15, is performed by means of the tables 182 and 79 of the database 162.

When the master object 175 or 192, respectively, has been found there a write lock is put on it. The write lock must be obtained from the database handler on the processor 160 that contains the master object, since allocation of lock on another processor is automatically performed by the distribution handler in the database. Simultaneously, with reference to FIG. 16, a lazy copy object 200 will be returned, arrow 202, to the database 156 containing the processor 150 where the search transaction was initiated, cf. also 66" in FIG. 5. At 204 in the processor 150 the process is shown, that started the access.

Figure 17:
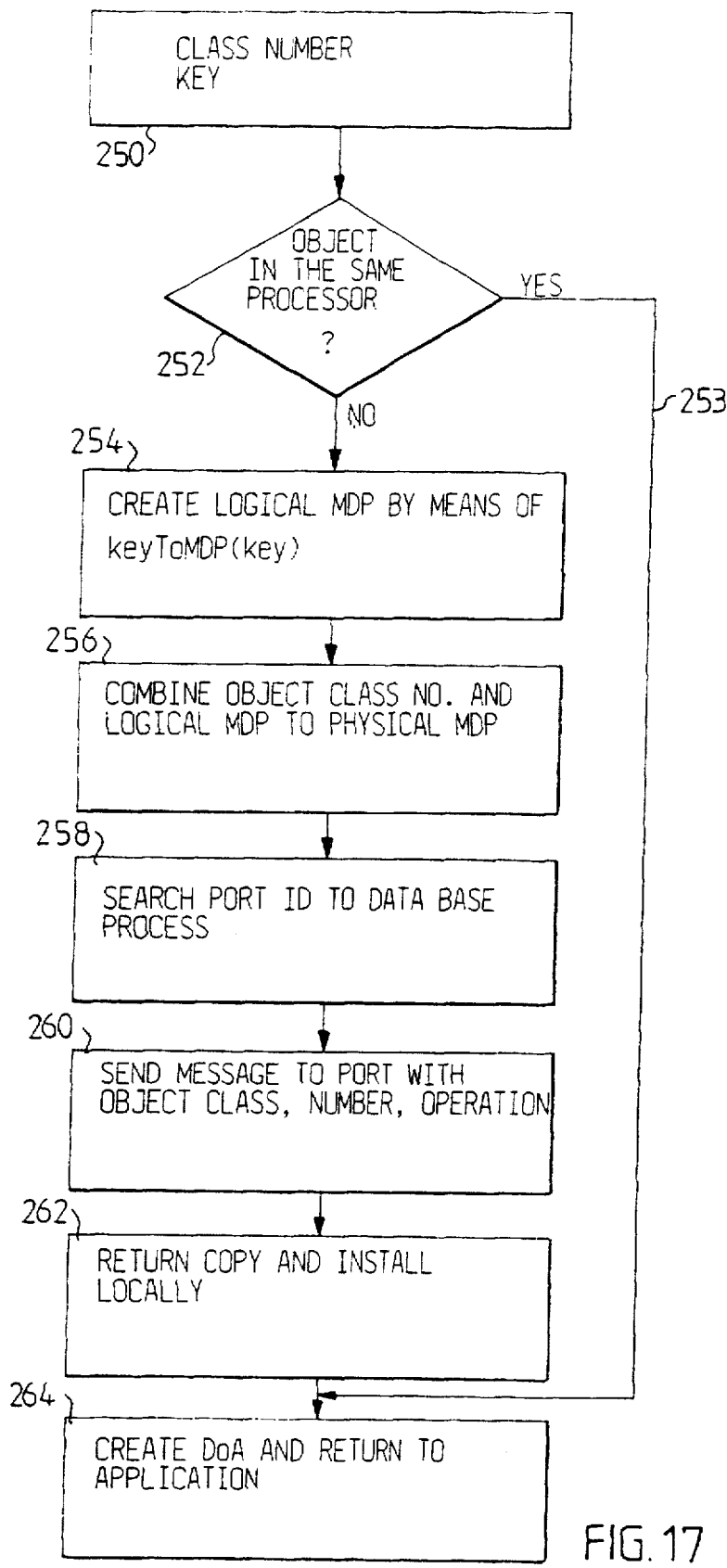
FIG. 17 shows a flow diagram summarizing one of the cases of the search processes described with reference to FIGS. 11–16.
Figure 18:
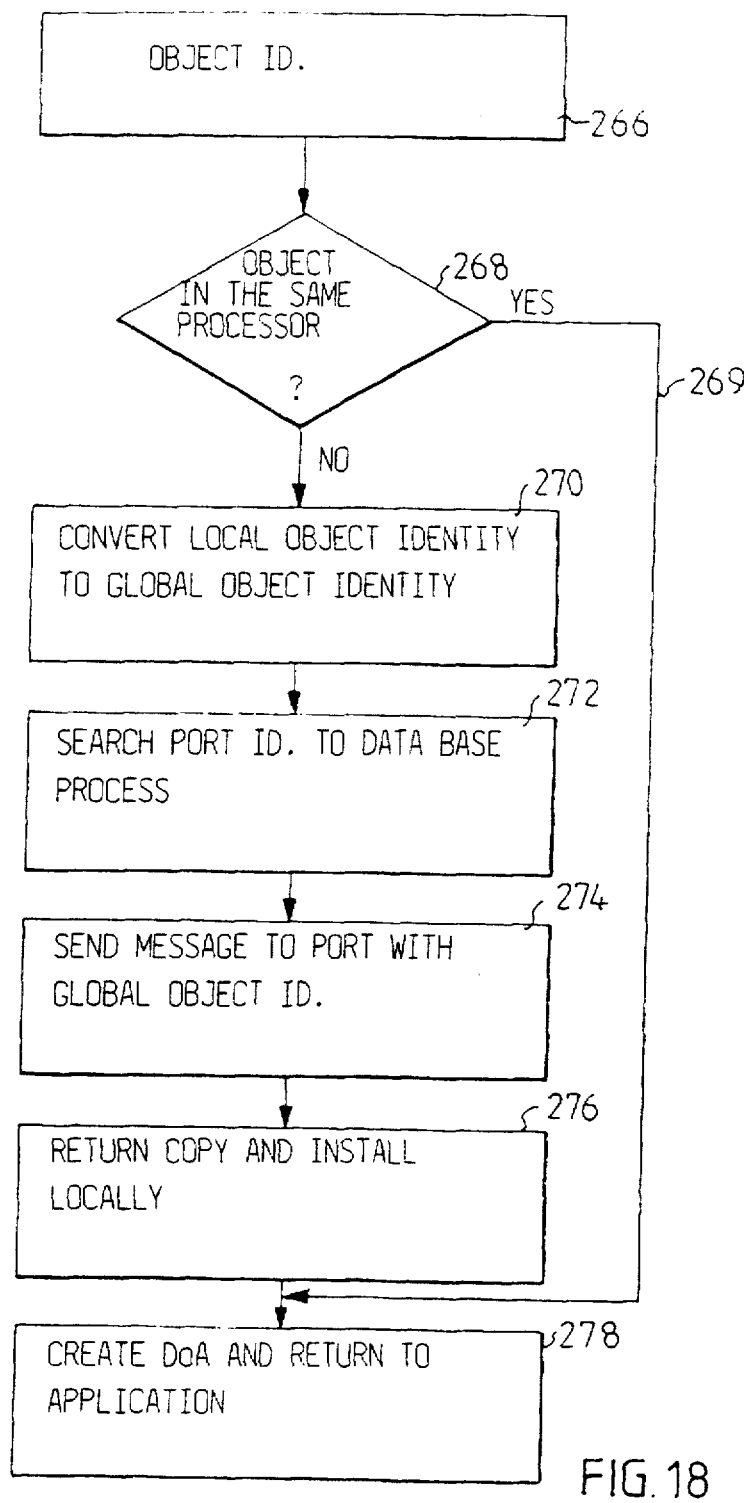
FIG. 18 shows a flow diagram summarizing the second case of the search processes described with reference to FIGS. 11–16.

The processes described above with reference to FIGS. 11–16 for transparent distribution will now, for the sake of clearness, be summarized by means of the flow diagrams shown in FIGS. 17 and 18.

In FIG. 17 search for the object is started by means of class number plus key, step 250.

The search is first performed in the local processor for trying to find there the current master object. This is performed in the local key table 79, cf. FIG. 7, by means of the key. If it is found in step 252 that the object is located in the same processor, the process continues according to arrow 253 to the end step in FIG. 17 described more closely below.

Figure 12:
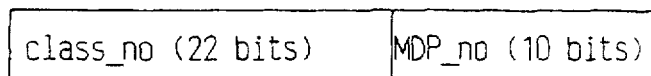
FIG. 12 is a view of a physical identity of a distribution entity.

If it is found in step 252 that the object cannot be found in the same processor there is created, in accordance with that described with reference to FIG. 11, in step 254 a logical distribution entity by means of the transformation function keyToMDP(key), and in step 256 a physical distribution entity by the combination of object class number and logical distribution entity according to FIG. 12.

Thereafter, in step 258, search is performed for the port identity to the data base process in the processor, in the subdatabase of which the searched object is located. More particularly this is carried through by searching by means of tables according to FIG. 13.

In step 260 a message is sent to the port in question. In the message class number and key are included since the distribution entity number is not enough for identifying the object uniquely. It also appears from the message what shall be done with the object in order to be able to put a read or write lock at need.

After the searched object has been found by local searching in the table 79 in FIG. 14 of the found processor, a copy object is returned in step 262 to the processor that has started the access, cf. that described with reference to FIG. 16, and is installed there.

In step 264, finally, the database agent DOA is created in accordance with that described in the U.S. patent application 08/264,059 and is returned to the application process.

In FIG. 18 search for the object is started by means of the object identity, step 266.

The search is first performed in the local processor for trying to find there the current master object by means of the local object identity and the local table 80, cf. FIG. 7. If it is found, in step 268, that the object is present locally, the process continues directly to the last step in FIG. 18 according to arrow 269.

If it is found in step 268 that the object is not in the same processor, the local object identity by the application is converted to a global object identity in step 270, in accordance with that described above in connection with FIG. 5.

Thereafter a port identity is searched in step 272 to the database process in the processor, in the subdatabase of which the searched object is located. More particularly, this is performed by searching by means of the distribution entity number, in table 82 in FIG. 7, included in the global object identity.

In step 274 a message is sent to the port in question. In the message there is included the global object identity. It also appears from the message what shall be done with the object, for making it possible to put a read or write lock at need.

After the searched object has been found by local search in the table 174 in FIG. 14 of the found processor, a copy object is returned in step 276 to the processor that started the access, cf. that described with reference to FIG. 16, and is installed there.

In step 278 finally, a database object agent DOA is created and returned to the application process.

What is claimed is:

1. A distributed database system including a data base, and a number of interconnected processors for handling different parts of said data base, said data base parts including a number of data entities, each such data entity having in association therewith global information regarding in which processor the data entity is located, and local information regarding where the data entity is located in the own processor, said global information being located in each processor in the system in the form of global information common and specific to each of predefined sets of data entities, wherein said sets of data entities consist of distribution entities, which each contain information regarding a number of instances of a specific type of data entities located in a certain processor, and information by means of which an address to that processor can be found, wherein the data entities are addressable either by means of key values or by means of data entity identities containing information regarding the distribution entity to which the data entity belongs, as well as information identifying the data entity and wherein the data entity identities include local and global data entity identities, each local data entity identity including a first information field identifying the own processor and a second information field identifying the data entity, and each global data entity identity including a first information field identifying a distribution entity and a second information field identifying the data entity.

2. A system according to claim 1, wherein said local information is contained in at least three tables, of which a first table contains local data entity identities, a second table includes global data entity identities, and at least a third table contains key values, and said global information is contained in a fourth table which contains distribution entity numbers, and for each such distribution entity number points to another processor.

3. In a distributed database system, including a data base, and a number of interconnected processors for handling different parts of said data base, said data base parts including a number of data entities, each such data entity having in association therewith global information regarding in which processor the data entity is located, and the local information regarding where the data entity is located in its own processor,

- a method for accessing a data entity belonging to a specific class based on a key value unique to the data entity and an identification number for the class in question, comprising the steps of:
- starting searching for the data entity first in its own processor based on the key value; and
- if this search reveals that the data entity does not exist in its own processor,
- creating a logical distribution entity number that identifies information regarding a number of instances of the class of the data entity, which are located in a certain processor, and address information regarding the certain processor;
- creating a corresponding physical distribution entity number of combining information regarding the class of the data entity and the logical distribution entity number;
- identifying the certain processor in the data base of which the searched data entity is located, by the physical distribution entity number;
- sending a message to the processor in question containing information regarding the searched data entity;
- searching locally in the found processor based on the key value of the data entity to be accessed; and
- returning a copy of the found data entity to the processor that has requested the access.

4. In a distributed database system, including a data base, and a number of interconnected processors for handling different parts of said data base, said data base parts including a number of data entities, each such data entity having in association therewith global information regarding in which processor the data entity is located, and local information regarding where the data entity is located in its own processor, a method for accessing a data entity belonging to a specific class of data entities, comprising the steps of:
- creating a local data entity identity which contains information regarding a distribution entity which in turn includes information regarding a number of instances of the class of the data entity which are located in the own processor, as well as information identifying the data entity;
- starting searching in the local processor in order to try to find there the data entity based on the local data entity identity; and,
- if this search reveals that the data entity is not located in the own processor,
- converting the local data entity identity to a global data entity identity which contains:
  - information regarding a distribution entity which in turn includes information regarding a number of instances of a specific class of data entities located in a certain processor, the data entity to be accessed belonging to said class, and information regarding the address to said certain processor, and
  - information identifying the data entity to be accessed;
- searching the processor in which the data entity to be accessed is located by the distribution entity included in the global data entity identity;
- sending a message to the processor in question in which the global data entity identity is included;
- searching the data entity identity in the processor found by means of the global data entity identity; and
- returning a copy of the data entity identity found to the processor that started the access.

* * * * *